BISTABLE CIRCUIT

Filed Sept. 15, 1951 3 Sheets-Sheet 1

INVENTORS: A. E. ANDERSON
R. L. TRENT
BY
H. A. Burgess
ATTORNEY

BISTABLE CIRCUIT

Filed Sept. 15, 1951 3 Sheets-Sheet 2

INVENTORS: A. E. ANDERSON
R. L. TRENT
BY
H. A. Burgess
ATTORNEY

INVENTORS: A. E. ANDERSON
R. L. TRENT
BY
H. A. Burgess
ATTORNEY

Patented Dec. 16, 1952

2,622,212

UNITED STATES PATENT OFFICE 2,622,212

BISTABLE CIRCUIT

Alva Eugene Anderson, Mountainside, and Robert L. Trent, Far Hills, N. J., assignors to Bell Telephone Laboratories, Incorporated, New York, N. Y., a corporation of New York Application September 15, 1951, Serial No. 246,833

16 Claims. (Cl. 307—88)

This invention relates to trigger circuits.

A circuit of the type described in detail below for illustrative purposes has two stable states which are manifested as an output by two voltage levels. This circuit can be triggered from one stable state to the other by the application of pulses of the same polarity to a common input terminal. One complete cycle of events occurs at an output terminal for each two input cycles; such a circuit will therefore count or divide by two, from which the terms "binary counter" and "scale-of-two" circuits have been derived. The circuit, basically, is a "scale-of-one" circuit, but the illustrative circuit to be described has been converted into a scale-of-two circuit by means of steering diodes which steer successive input pulses to alternate control points.

The circuit described employs as two of its main elements current-multiplication devices, which have come to be known as "transistors." Transistors are described, for example, in Patent 2,524,035, to J. Bardeen and W. H. Brattain, dated October 3, 1950. One type of transistor, as described therein, comprises a block of semiconductive material, one surface of which has been treated to give it a conductivity of the type opposite to that of the remainder of the body. Two electrodes known as the emitter and collector electrodes make point contact with the treated surface, while a third electrode known as the base electrode makes ohmic contact with the opposite surface. Electrode currents are designated positive if they flow into the semiconductive body. If the semiconductive body comprises n-type material with the treated surface being p-type, normal emitter current will be positive; and normal collector current will be negative, with the latter usually exceeding the former in magnitude. The base current, being the algebraic sum of two, will thus normally be positive. If the semiconductive body comprises p-type material, the directions of normal current flow will be the reverse of those mentioned above.

It is an object of the invention to reduce the triggering requirements of a binary counter.

Another object of the invention is to increase the triggering sensitivity of a binary counter.

Another object of the invention is to promote triggering reliability in binary counters.

A more specific object of the invention is to place the "off" unit of a two-element binary counter at a point on its operating characteristic which is very near the triggering point so that the circuit may be triggered by very small input pulses. A related object of the invention is to provide a binary counter with sufficient inertia so that once it commences to proceed from one stable state to the other, it will not return to the stable state from which it has just proceeded.

The single binary counter stage described in detail below employs two bistable transistor trigger circuits. Each elemental trigger circuit comprises a single transistor having a large resistance connected in its base circuit. This resistance promotes regenerative feedback so that the emitter current-voltage characteristic of each trigger circuit has a region of negative slope bounded on either side by regions of positive slope with which it is continuous. The two trigger circuits are provided with common and cross-coupling so that when one unit is in the stable state characterized by high positive emitter current (on), the other unit is in the other stable state which is characterized by low negative emitter current (off). Triggering pulses at a common input terminal reverse the stable states of the two units.

In accordance with principles of the invention, the emitter electrodes are biased by a common resistor through which the emitter currents of both units flow. Asymmetrically conducting impedance elements, which are biased by the voltage drop across this resistor, are inserted between the common resistor and each emitter electrode. The "load-line" impedance of each unit includes the common resistor and the resistance of its associated asymmetrical element. The asymmetrical devices or diodes are poled so that the diode associated with the "off" unit is biased in its high resistance condition by the low negative emitter current of the "off" unit, while the other diode is biased in the forward direction by the high positive emitter current of the "on" unit. This provides a higher "load-line resistance" for the "off" unit and places the "off" unit at a point on its characteristic as near as desired to the trigger-ing point, thereby permitting triggering by very small input pulses.

In accordance with other principles of the invention, triggering reliability and cross-coupling are enhanced by a capacitive coupling between the emitter electrodes. This coupling, in addition to enhancing the above-mentioned cross-coupling, provides the circuit with "memory" so that once a triggering pulse initiates a change from one stable state to the other, the circuit will "remember" the state from which it has just proceeded and will continue to the other state of equilibrium.

These and other objects and features of the present invention may be better understood from a consideration of the following detailed description when read in accordance with the attached drawings, in which.

Figure 1:
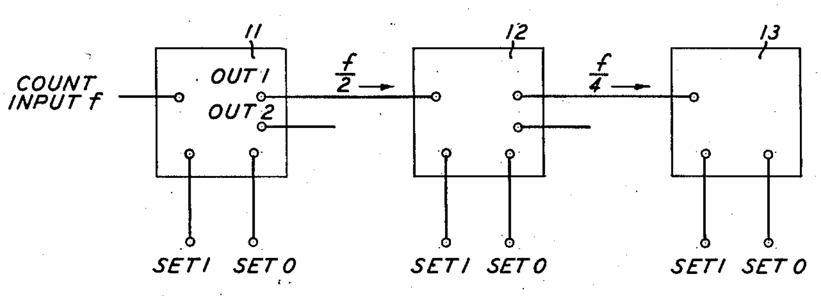
Fig. 1 illustrates by block schematic diagram a three-stage binary counter.

A functional representation of a three-stage binary counter is illustrated in Fig. 1. Each of the stages 11, 12, and 13 comprises a bistable trigger circuit. If input pulses at a repetition rate *f* are applied to the "count input" of the first stage 11, a pulse train having a repetition rate *f*/2 will appear at its output. This latter train is applied as an input to the second stage 12, which further divides the repetition rate by two so that a pulse train having a repetition frequency *f*/4 is applied to the third stage 13. Further stages may be added in an obvious manner. Terminals are provided at each stage to "set" the stages to the desired one of the two stable states, these states being designated as "1" and "0." The three stages illustrated will count up to $2^3=8$, so that the third stage will undergo one cycle for each eight pulses applied to the first stage.

Figure 2:
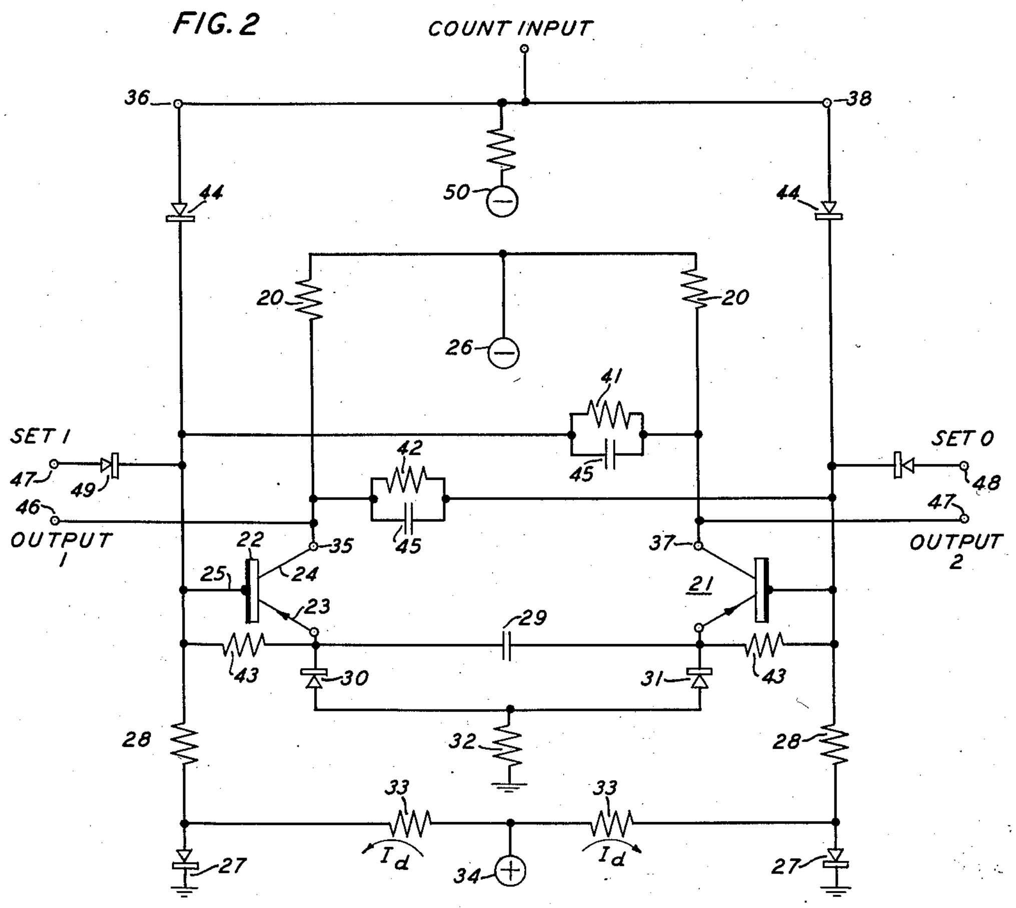
Fig. 2 is a circuit schematic of a single stage binary counter employing principles of the present invention.

The binary counter stage illustrated in Fig. 2 comprises two transistor trigger circuits. Each trigger circuit comprises a transistor 21 having a block of semiconductive material 22, an emitter electrode 23, a collector electrode 24, and a base electrode 25. Current is supplied from a source of negative potential 26, e. g., about −45 volts, to the collector electrodes 24 through the current-limiting resistors 20. The collector circuit is completed through the direct-current source 26, the positive terminal of which is grounded, the asymmetrically conducting impedance element 27 which may, for example, comprise a germanium crystal diode, the resistor 28, the base electrode 25, and the block of semi-conductive material 22. Neglecting for the time being the capacitor 29 and the diodes 30 and 31, the emitter electrodes are biased by a common biasing resistor 32, one terminal of which is either grounded, as shown, or returned to a small positive or negative biasing potential, as desired. The use of a single biasing resistor 32 eliminates the need of separate emitter battery supplies.

The elemental trigger circuits just described are of the type described in a copending application of A. J. Rack, Serial No. 185,041, filed September 15, 1950, which issued as Patent 2,579,336 on December 18, 1951. A bias current $I_d$ applied to the diodes 27 through the large resistors 33 from the source 34 holds the diodes in their low resistance condition for negative emitter currents; this is the region in Fig. 3 to the left of the emitter voltage ordinate. By way of illustration and including the resistance of the resistors 28, there will be approximately 1000 ohms in series with the equivalent transistor base resistance in the negative emitter current stable region. The biasing current $I_d$ provided by the source 34 may be adjusted to be equal and opposite to the base current which flows when the emitter current is equal to zero. Due to the current amplification properties of the transistor, the current flowing in the collector circuit due to emitter current greater than zero will exceed the emitter current in magnitude. Therefore, as the emitter current becomes greater than zero, the biasing current $I_d$ will be exceeded by the positive base current which flows from the base electrode 25 into the semiconductive body 22. When the current reverses in the diodes 27, they will become high impedances and, in combination with resistors 33 which they shunt, will insert approximately 10,000 ohms in their associated base circuits. Due to the normal direction of current flow in the various electrodes, the voltage drop across the base circuit resistance will be series-aiding with the emitter voltage and hence provide regenerative feedback. It is this feedback which gives rise to the region of negative slope in the positive emitter current region illustrated in Fig. 3.

The use of a biased diode 27 to provide such a two-valued feedback resistance instead of a lumped resistance element greatly reduces variations in the triggering point which have been traced to variations with temperature or from unit to unit in the base current which flows when the emitter current is either zero or negative. If the diodes 27 were omitted, these current variations would produce appreciable voltage variations in the turning point. The use of a diode in effect removes the large feedback resistance until it is needed to provide regeneration, at which time it is inserted in series with the equivalent base resistance.

Due to the variations in base current when the emitter current is either negative or zero, the diodes 27 may not switch to their high resistance conditions exactly at zero emitter current but instead may remain low resistances until some small but finite value of positive emitter current is reached. With only a low resistance in the base circuit, there would be a small region of positive resistance in the positive emitter current region near zero emitter current which would retard triggering response and which would necessitate larger triggering pulses. To eliminate this undesirable effect, the resistors 28 are inserted between the base electrodes 25 and the biased diodes 27. These resistors each have a value which is small compared to the resistors 33 so as not to introduce appreciable variations in the turning point at zero emitter current but which is large enough to insure instability when zero emitter current is reached. The use of such a resistor as the resistors 28 is described in copending application of R. L. Trent, Serial No. 223,522, filed April 28, 1951.

Figures 3, 4, 5, 6:
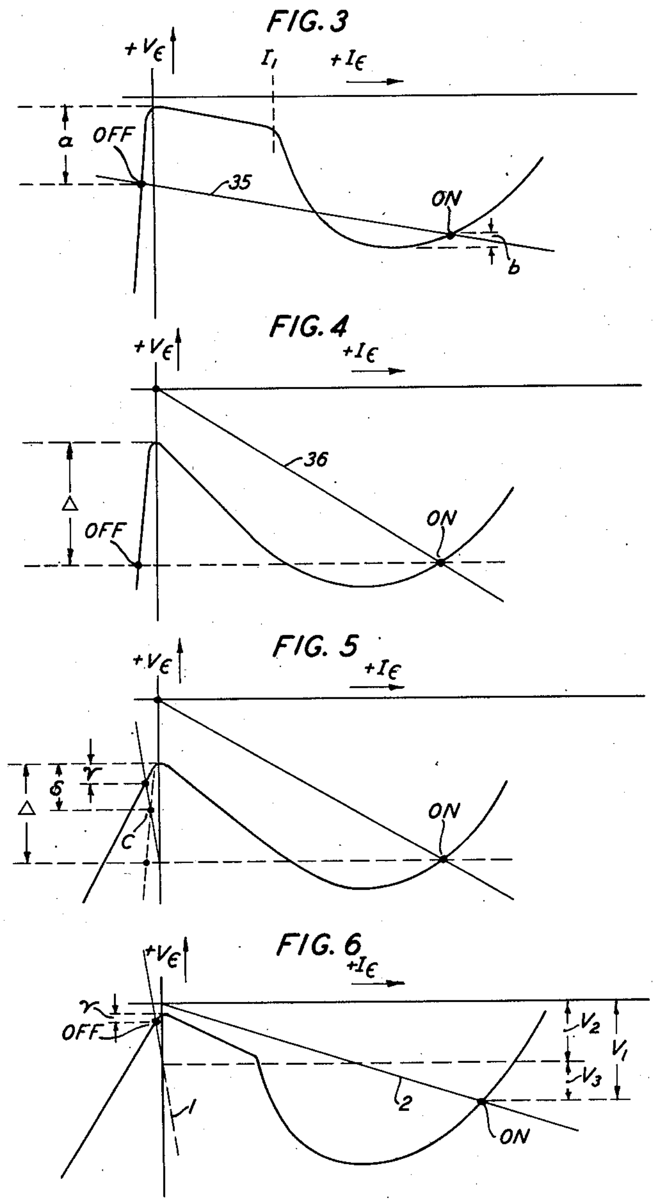
Figs. 3 through 6 are current-voltage characteristics of various portions of the circuit of Fig. 2.

The effect of resistors 28 is illustrated in Fig. 3. Although the biasing current $I_d$ for the base diode 27 may be initially adjusted to be equal and opposite to the base current at zero emitter current, a temperature variation is assumed so that the diode does not switch to its high resistance condition until a positive emitter current $I_1$ is reached. Were it not for the resistors 28, the characteristic between zero emitter current and $I_e=I_1$ would have a positive slope. The resistors 28, however, provide sufficient feedback to insure a negative region even though the diodes 27 do not switch to their high resistance condition exactly at zero emitter current. The biasing current $I_d$ for the base diode 27 may alternatively be adjusted to be larger and opposite to the base current obtained at zero emitter current for an average acceptable transistor. This will permit the interchangeable use of transistors having wide initial variations in base currents for zero emitter current.

The magnitude of the resistor 32, which is designated the "load-line" resistor, determines the slope of the load line 35 shown in Fig. 3. Load line 35 is drawn assuming that a negative bias is applied in series with resistor 32, for example, as explained in the above-mentioned Rack application. Since the load line intersects the emitter current-emitter voltage characteristic in both regions of positive slope as well as in the negative resistance region, each trigger circuit has two stable points represented by the intersections of the load line and the current-voltage characteristic in the regions of positive slope. For example, if the circuit is resting in the stable state designated "off" in the negative emitter current region, an input voltage having an amplitude $a$ will trigger the circuit by driving it into its negative resistance region. The circuit will proceed rapidly through the unstable region, coming to rest at the stable point designated "on" in the positive emitter current region. If the emitter voltage is decreased by an amount greater than $b$ when the circuit is "on," it will return to its "off" stable point.

One of the important stability criteria of a binary counter of this type is that if it has been set in one condition, it must maintain that condition indefinitely or until the next pulse to be counted is impressed upon its input. In the circuit shown in Fig. 2, lock-up is afforded both by the resistors 41 and 42, which cross-couple the collector and base electrodes 24 and 25 of the two trigger circuits, and by resistor 32. For a zero order analysis, the effects of the resistors 41 and 42 may be neglected, and it may be assumed that each circuit acts as a separate negative resistance circuit. On this simple basis, the combination behavior is illustrated in Fig. 4, which shows a negative resistance characteristic taken to apply to each transistor as it behaves separately in the circuit. The negative bias in series with resistor 32, assumed in the above discussion in connection with Fig. 3, is now omitted to conform with Fig. 2 so that the load line 36 in Fig. 4 intersects the coordinate at the origin. One unit is assumed to be "on" at high positive emitter current, and the other unit is assumed, by prior knowledge, to behave as a non-active or passive network at this point in the operational cycle. Since both emitters must be at the same voltage by virtue of their connection to a point of common potential, neglecting for the time the asymmetrical elements 30 and 31, the "off" unit emitter electrode will be at the same voltage as the "on" unit, as shown in Fig. 4.

If the circuit were as described thus far, the minimum voltage required to trigger the "off" unit would be $\Delta$. The value of $\Delta$, while it may not be prohibitive, may be larger than desired. In accordance with the invention, $\Delta$ may be reduced without sacrifice to lock-up or stability by inserting the asymmetrical impedance elements or diodes 30 and 31 between the common biasing resistor 32 and the emitter electrodes 23. These diodes effectively decouple the emitters to a limited extent by virtue of their asymmetrical impedance characteristics. If it is assumed that the left-hand elemental trigger circuit is "on," the diode 30 will be conducting in the forward direction due to the large positive emitter current so that the "on" emitter voltage is approximately the drop across the resistor 32. However, the diode 31 connected to the emitter electrode of the "off" unit will be biased in the reverse direction by the negative current flow of this unit and by the voltage drop across resistor 32 due to the positive emitter current of the "on" unit, thereby inserting a large resistance in the emitter circuit of the "off" unit. The emitter electrode of the "off" unit will, therefore, no longer rest at the same emitter voltage as that of the "on" unit but will be at a higher voltage, as indicated at $c$ in Fig. 5. The triggering sensitivity has thus been increased from $\Delta$ to $\delta$ with the voltage difference $(\Delta-\delta)$ appearing across the emitter diode of the "off" unit. The addition of the resistors 43 which shunt the high emitter-base resistance in the negative emitter current region modifies the characteristic of Fig. 5 by decreasing the slope in the negative emitter current region, as shown in Fig. 3, to further increase the trigger sensitivity to $\gamma$.

An approximate emitter characteristic is depicted in Fig. 6 for one of the two transistors of the complete binary counter stage shown in Fig. 2. The base stabilization diode 27 assures that the turning point of the characteristic will be very close to zero voltage regardless of temperature variations or variations in base current from unit to unit. The resistor 28 assures instability in the positive emitter current region near zero emitter current even though the base diode 27 does not switch to its high resistance condition at zero emitter current. Before the base diodes become high impedances, the slope in the negative resistance region is determined primarily by the resistor 28. When the diode 27 becomes a high resistance, the negative resistance is determined by the total series base resistance, i. e., the resistance of resistors 28 and 33, neglecting the shunting effect of the diode 27 reverse resistance.

If one of the transistors is assumed to be in the "on" condition, the diode 30 or 31 in series with its emitter will be in its low resistance condition. The slope of the emitter load line for the "on" unit, load line 2, is determined primarily by the resistance of the resistor 32 and the forward resistance of the diode 30 or 31. This load line extends through the origin and intersects the characteristic, the latter intersection representing the stable "on" point. The total emitter voltage drop $V_1$ for the "on" unit is composed of the drop through resistance 32, designated as $V_2$, and the drop through the low forward resistance of its associated emitter diode, designated $V_3$. Since the other transistor is in the "off" condition, its emitter current is slightly negative, and its emitter diode will be in the high resistance state. The load line for the "off" unit may then be drawn from the intersection of the voltage $V_2$ with the ordinate. Load line 1 in Fig. 6 represents the load line of the "off" unit and has a slope determined primarily by the high backward resistance of the diode in series with its emitter. This load line intersects the characteristic at the "off" stable point, which, as previously indicated, is at a less negative voltage than the "on" stable point.

The binary counter in Fig. 2 may be triggered with either positive or negative pulses providing the proper steering diode polarity is observed. The steering diodes 44 in Fig. 2 are connected for triggering by positive pulses. Steering for sequential operation in counting is accomplished by the difference of potential existing between the base electrodes of the "on" and "off" units. The base of the "on" unit will be more negative than the base of the "off" unit due to the base current which flows through the diode 27 and resistor 33 in parallel and the resistor 28 into the semiconductive body 22. The steering diode 44 connected to the base of the "off" unit will therefore be a high resistance, blocking input pulses, while the steering diode 44 connected to the base of the "on" unit will be a low resistance, readily passing input pulses. A small negative bias from the source 50 may be applied to the input terminal to aid in biasing the steering diodes. Alternatively, the direct-current potential of the collector electrodes may be used to bias the steering diodes 44, for example, by connecting resistors between terminals 35—36 and 37—38, respectively, and by isolating terminals 36 and 38 for direct currents by blocking condensers. This alternative scheme would also aid in insuring proper steering, since the collector electrodes will vary on the order of 20 volts between "off" and "on."

A positive pulse applied to the input terminal will therefore appear at the base electrode 25 of the "on" unit. Because of the low impedance from base to emitter in the "on" condition, this pulse is passed by the coupling capacitor 29 to the emitter of the "off" unit, which is at a high impedance. Since the "off" unit is stable at an emitter voltage very close to the turning point in the characteristic, as shown in Fig. 6, it will be triggered "on" relatively easily. When the "off" unit triggers "on," a sharp positive pulse will appear at its collector 24 due to the voltage drop across its current-limiting resistor 20. This latter pulse, also positive, is passed by means of the cross-coupling capacitor 45 back to the base electrode of the "on" unit in a positive direction. If the characteristic is shifted sufficiently positive so that the emitter load line 2 in Fig. 6 no longer intersects the characteristic, the only stable point remaining will be in the "off" or negative emitter current region. Thus, the collector voltage becomes more negative, following the time constant of the cross-coupling capacitor 45 and its associated discharging resistance. It is this time constant which sets an upper limit to the repetition rate of the counter. The next pulse will reverse the stable states of the elemental trigger circuits.

The coupling capacitor 29 performs an important role in accordance with principles of the invention in addition to passing the pulses from the "on" emitter to the "off" emitter. It is this capacitor which gives the circuit memory by maintaining the potential difference existing between the emitter electrodes 23 during the initial triggering interval, thereby assuring that the steering diodes 44 will remain properly polarized for the duration of the triggering pulse. This prevents an input pulse from being applied to the base electrodes of both units during one counting interval and permits the circuit to proceed from one stable state to the other without reverting to its original state.

Triggering by negative pulses may be accomplished by reversing the polarity of the steering diodes 44 so that a negative input pulse will be applied only to the base of the "off" unit.

The collector electrodes 24 in Fig. 2 alternate, out of phase, between two negative voltages, the collector of the "on" unit being the less negative. The output of the binary counter may be taken from either or both collector electrodes, depending on the application. In some applications, the quiescent state of the counter is sampled, and it is this determination which is controlling. In other applications, it is the pulses produced when the counter proceeds from a certain one of its two states to the other which is controlling. Further, when several binary counters are connected in tandem, the output will be taken from one or the other unit, depending on whether addition or subtraction is desired. Output may be taken from both units when symmetrical or push-pull is desired. Designating the less negative collector voltage as "1" and the more negative "0," the counter will register a "1" when the right-hand transistor is "on" and the left-hand transistor is "off" if the output is taken from the collector 24 of the left-hand unit, output "1." When the stable states are reversed, the counter will register a "0." The converse will be true if output is taken from the right-hand transistor, output "2."

A feature of the circuit is that the logical negative of the output desired is always present at the collector electrode other than the one from which the desired output is being taken. This feature will find many applications in computing circuits generally, for example, making unnecessary inverters when the negative of the output is required to perform some desired function.

The binary counter may be initially set to give either output by the auxiliary inputs 47 and 48 designated "set 1" and "set 0." A positive pulse applied to the "set 1" terminal 47 will pass through the diode 49 and turn the right-hand unit "on" and the left-hand unit "off" unless they were already in these states, in which case there will be no change. Similarly, a positive pulse applied to the "set 0" terminal will produce a "0" at the output terminal 2.

The output terminal 46 may, for example, be connected to a registering device or may be connected by a differentiating capacitor through steering diodes similar to the diodes 44 to the base electrodes of a succeeding binary counter similar to the one shown.

The circuit shown in Fig. 2 is a scale-of-two circuit, each output terminal going through one cycle of output conditions for each two input pulses. By omitting the steering diodes 44, however, the circuit will perform as a scale-of-one circuit, assuming enough capacitance in the input to differentiate the input pulses. The circuit is still bistable but will act as a monostable circuit, each output terminal going through one cycle of output conditions for each input pulse.

Figure 7:
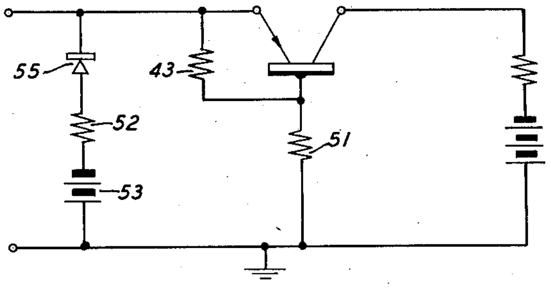
Figs. 7 and 8 illustrate principles of the invention as applied to single transistor trigger circuits.
Figure 8:
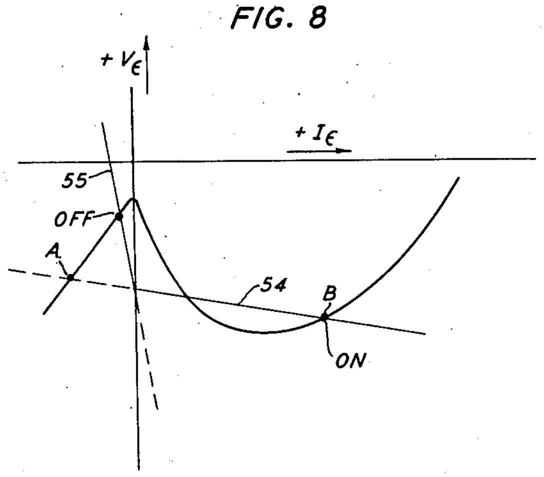

The triggering sensitivity feature described above in connection with a symmetrical binary counter may also be employed in single transistor trigger circuits. The trigger circuit shown in Fig. 7 omits the biased base stabilizing diode described above and includes only a feedback resistor 51 in the base circuit and a resistor 43 which shunts the emitter and base electrodes. The load-line resistor 52 and biasing battery 53 combine to give the circuit a load line 54, as shown in Fig. 8. If the diode 55 were omitted, the circuit would have a stable point in the negative emitter current region at A and another stable point in the positive emitter current region at B. The addition of the diode 55, however, increases the slope of the load line in the negative emitter current region, as indicated by the line 55, to give the circuit a new stable point at C which requires a much smaller triggering voltage than operating point A. The slope of the load line is increased in the negative emitter current region due to the fact that the diode 55 will be biased in its high backward resistance in this region by the negative emitter current. When the emitter current becomes positive, the diode 55 switches to its low forward resistance, and the load line assumes the slope of load line 54 in the positive emitter current region. This slope is adjusted to make the stable point B close to the turning point in the positive emitter current region so that only a small negative voltage will be required to trigger the circuit back to its "off" stable point. The circuit just described is similar to one disclosed and claimed in a copending application of B. Ostendorff, Jr., application Serial No. 292,875, filed June 11, 1952.

Although the invention has been described as relating to a specific circuit, other embodiments and modifications will readily occur to one skilled in the art so that the invention should not be deemed limited to the embodiments specifically described. For example, the invention should not be deemed limited to point contact transistors of the type described but is equally applicable to other types, such as junction (n—p—n, p—n—p, p—n, etc.) transistors.

What is claimed is:

1. A bistable circuit comprising a pair of cross-coupled trigger circuits, each of said trigger circuits comprising a transistor having at least an emitter electrode, connected in a circuit including a source of current and each of said trigger circuits having two stable operating conditions, one characterized by positive emitter current and one characterized by negative emitter current, said trigger circuits being in opposite stable operating conditions, means for intercoupling said emitter electrodes, biasing means common to said trigger circuits, and means comprising a pair of similarly poled asymmetrically conducting impedance elements connecting each of said emitter electrodes to said biasing means.

2. The combination in accordance with claim 1, wherein said biasing means comprises a resistor.

3. The combination in accordance with claim 1, wherein said intercoupling means comprises a capacitor.

4. The combination in accordance with claim 1 of means to apply positive input pulses to the one of said trigger circuits which is in the stable operating condition characterized by positive emitter current.

5. The combination in accordance with claim 1 of means to apply negative input pulses to the one of said trigger circuits which is in the stable operating condition characterized by negative emitter current.

6. A bistable circuit comprising a pair of trigger circuits, each of said trigger circuits comprising a translating device having three electrodes, a first circuit including a source of direct current and a first and second of said three electrodes, means comprising a third of said three electrodes to control the current flow in said first circuit and means to render the said trigger circuit unstable over at least a portion of its operating range, means to cross-couple the said first and second electrodes of the said first and second translating devices, means to intercouple the said third electrodes, and means comprising a pair of asymmetrically conducting devices connecting the said third electrodes to a common potential point.

7. The combination in accordance with claim 6, wherein said last-named coupling means includes capacitance.

8. The combination in accordance with claim 6, wherein the said last-named means comprise a second circuit for each of said translating devices, each of said second circuits including the said first and third electrodes of the device with which the said second circuit is associated, a resistor common to both of said second circuits, and an asymmetrically conducting device connected between said resistor and the said third electrodes of each device.

9. The combination in accordance with claim 6, and means to apply input pulses to one of the electrodes of each of said translating devices.

10. A binary counter comprising a pair of cross-coupled trigger circuits, each of said trigger circuits comprising a translating device having three electrodes, a first circuit including a source of current and a first and second of said three electrodes and a second circuit including a second and third of said three electrodes, each of said trigger circuits having two stable operating conditions, one characterized by high current flow in said second circuit and one characterized by low current flow in said second circuit, capacitive means interconnecting a pair of similar electrodes, one from each of said translating devices, a similarly poled asymmetrically conducting impedance element connected in each of said second circuits, and means common to said second circuits to bias said asymmetrical elements in opposite conducting conditions.

11. A binary counter comprising a first and a second trigger circuit, said first and second trigger circuits each comprising a transistor having an emitter electrode, a collector electrode, and a base electrode and means to render said transistor unstable over at least a portion of its current-voltage operating range, means to cross-couple said collector and base electrodes, a common biasing supply for said emitter electrodes, means comprising a pair of asymmetrical conducting impedance elements to connect each of said emitters to said supply, means to apply input pulses to said base electrodes, and capacitive means interconnecting said emitter electrodes.

12. A bistable circuit comprising a pair of transistors each having an emitter electrode, a collector electrode, and a base electrode, means to couple the collector electrode of each transistor with the base electrode of the opposite transistor, means to apply triggering pulses to said base electrodes, capacitive means intercoupling said emitter electrodes, a pair of circuits each including one of said emitter electrodes, a resistor common to both of said pair of circuits, and an asymmetrically conducting device for each of said circuits connected between said resistor and the said emitter electrode included in that circuit.

13. The combination in accordance with claim 12 of means to derive a first output from the said collector electrode of one of said transistors and means to derive the logical negative of said first output from the said collector electrode of the other of said transistors.

14. A bistable circuit comprising a pair of transistors each having an emitter electrode, a collector electrode, and a base electrode, means to couple the collector electrode of each transistor to the base electrode of the opposite transistor, means to supply current to each of said transistors, means connecting each of said transistors in a trigger circuit having two states of equilibrium, one of said states characterized by positive emitter current of a relatively high magnitude and the other of said states characterized by negative emitter current of relatively low magnitude, the said trigger circuits being in opposite states of equilibrium, capacitive means interconnecting said emitter electrodes, an emitter circuit for each of said transistors including a resistor which is common to both of said emitter circuits, and an asymmetrically conducting impedance element connected between said common resistor and each of said emitter electrodes.

15. The combination in accordance with claim 14 of means to apply positive input pulses to the base electrode of the transistor connected in the trigger circuit which is in the one of said two states of equilibrium which is characterized by high positive emitter current, and means to derive an output from one of said collector electrodes.

16. The combination in accordance with claim 14 of means to apply negative input pulses to the base electrode of the transistor connected in the trigger circuit which is in the one of said two states of equilibrium which is characterized by low negative emitter current and means to derive an output from one of said collector electrodes.

ALVA EUGENE ANDERSON.
ROBERT L. TRENT.

No references cited.